US012687651B2

(12) United States Patent
Li et al.

(10) Patent No.: US 12,687,651 B2
(45) Date of Patent: Jul. 21, 2026

(54) METHOD, SYSTEM, AND DEVICE FOR FULL WAVEFORM INVERSION ON ELASTIC WAVE SEISMIC DATA

(71) Applicant: INSTITUTE OF GEOLOGY AND GEOPHYSICS, CAS., Beijing (CN)

(72) Inventors: Wenda Li, Beijing (CN); Hong Liu, Beijing (CN); Shoudong Huo, Beijing (CN)

( * ) Notice: Subject to any disclaimer, the term of this patent is extended or adjusted under 35 U.S.C. 154(b) by 417 days.

(21) Appl. No.: 18/526,800

(22) Filed: Dec. 1, 2023

(65) Prior Publication Data

US 2024/0369727 A1 Nov. 7, 2024

(30) Foreign Application Priority Data

May 6, 2023 (CN) .......................... 202310505870.3

(51) Int. Cl.
*G01V 1/30* (2006.01)
*G01V 1/36* (2006.01)

(52) U.S. Cl.
CPC .............. *G01V 1/303* (2013.01); *G01V 1/364* (2013.01); *G01V 2210/6222* (2013.01)

(58) Field of Classification Search
CPC .................. G01V 1/303; G01V 1/364; G01V 2210/6222; G01V 1/282; Y02A 90/30
See application file for complete search history.

(56) References Cited

U.S. PATENT DOCUMENTS

| | | | | |
|---|---|---|---|---|
| 5,583,825 A | * | 12/1996 | Carrazzone ............ | G01V 1/288 |
| | | | | 367/83 |
| 8,892,413 B2 | * | 11/2014 | Routh ...................... | G01V 1/28 |
| | | | | 702/6 |
| 9,442,204 B2 | * | 9/2016 | Krohn .................... | G01H 17/00 |
| 2010/0270026 A1 | * | 10/2010 | Lazaratos ................ | G01V 1/36 |
| | | | | 702/14 |
| 2013/0028052 A1 | * | 1/2013 | Routh ...................... | G01V 1/28 |
| | | | | 367/43 |

(Continued)

FOREIGN PATENT DOCUMENTS

| | | | | | |
|---|---|---|---|---|---|
| CN | 105467444 A | * | 4/2016 | ............ | G01V 1/362 |
| CN | 107422379 A | * | 12/2017 | ............ | G01V 1/303 |
| CN | 107765302 A | * | 8/2018 | ............ | G01V 1/282 |

*Primary Examiner* — Tung S Lau

(57) ABSTRACT

Disclosed are a method, system, and device for full waveform inversion on elastic wave seismic data. The method includes: constructing a convolutional neural network full waveform inversion module; determining a multi-scale inversion frequency based on the observation data; performing low-pass filtering on the observation data; determining an initial velocity and an RTM image corresponding to the current inversion frequency; determining a current inversion result by using the convolutional neural network full waveform inversion module based on the initial velocity and the RTM image corresponding to the current inversion frequency; determining whether inversion performed at the multi-scale inversion frequency is completed; if the inversion is not completed, performing inversion on a next frequency, performing smoothing processing on the inversion result, and replacing the initial velocity corresponding to the current inversion frequency with an inversion result obtained after smoothing processing until the inversion performed at the multi-scale inversion frequency is completed.

13 Claims, 17 Drawing Sheets

(56) References Cited

U.S. PATENT DOCUMENTS

| 2014/0039799 | A1* | 2/2014 | Krohn | ................... | G01V 1/368 |
| | | | | | 702/14 |
| 2015/0012256 | A1* | 1/2015 | Routh | ..................... | G01V 1/28 |
| | | | | | 703/10 |
| 2016/0238729 | A1* | 8/2016 | Warner | .................. | G01V 1/282 |
| 2017/0097428 | A1* | 4/2017 | Sun | ........................ | G01V 1/282 |
| 2017/0115418 | A1* | 4/2017 | Gratacos | ................ | G01V 1/282 |

* cited by examiner (e)

RMSE=8.41%

(f)

Distance(km)

RMSE=3.54%

Velocity(km/s)

METHOD, SYSTEM, AND DEVICE FOR FULL WAVEFORM INVERSION ON ELASTIC WAVE SEISMIC DATA

CROSS REFERENCE TO RELATED APPLICATION

This patent application claims the benefit and priority of Chinese Patent Application No. 2023105058703, filed with the China National Intellectual Property Administration on May 6, 2023, the disclosure of which is incorporated by reference herein in its entirety as part of the present application.

TECHNICAL FIELD

The present disclosure relates to the field of geophysical exploration technologies, and in particular, to a method, system, and device for full waveform inversion on elastic wave seismic data.

BACKGROUND

During oil exploration, to realize the exploration and development of complex oil and gas reservoirs, fine velocity modeling is an essential part. Quality of velocity modeling directly affects effect of subsequent data processing, for example, migration imaging. Conventional velocity modeling methods have been widely used in commercial software and actual production of oilfields, for example, velocity analysis, tomography, and full waveform inversion.

At present, an ultimate means of velocity modeling is to obtain an underground medium structure by performing full waveform inversion (FWI) on all pieces of information such as travel time and amplitude of seismic data. The full waveform inversion is mainly to update velocity characteristics of a shallow strata. However, it is difficult to update a deep background velocity. In addition, for deep learning modeling, a generalization capability of an end-to-end deep learning velocity modeling method is usually insufficient at present. Therefore, it is an urgent need for a velocity modeling method with strong capabilities of generalization and update of deep velocity characteristics.

SUMMARY

An objective of the present disclosure is to provide a method, system, and device for full waveform inversion on elastic wave seismic data, to implement high-accuracy velocity modeling, specifically implement inversion on a P wave velocity, an S wave velocity, and a density.

To achieve the above objective, the present disclosure provides the following technical solutions:

A method for full waveform inversion on elastic wave seismic data includes:

constructing a convolutional neural network full waveform inversion module, wherein the convolutional neural network full waveform inversion module is configured to determine an inversion result based on an initial velocity and a reverse time migration (RTM) image;

obtaining observation data, and determining a multi-scale inversion frequency based on the observation data, wherein the multi-scale inversion frequency comprises a plurality of inversion frequencies sorted in order from low to high, and inversion starts from a low frequency;

performing low-pass filtering on the observation data by using a current inversion frequency;

determining an initial velocity and an RTM image corresponding to the current inversion frequency based on the observation data obtained after low-pass filtering;

determining a current inversion result by using the convolutional neural network full waveform inversion module based on the initial velocity and the RTM image corresponding to the current inversion frequency;

determining whether inversion performed at the multi-scale inversion frequency is completed;

if the inversion is not completed, performing inversion on a next frequency based on the order of the inversion frequencies of the multi-scale inversion frequency, returning to the step of performing low-pass filtering on the observation data by using a current inversion frequency, performing smoothing processing on the current inversion result, and replacing the initial velocity corresponding to the current inversion frequency with an inversion result obtained after smoothing processing until the inversion performed at the multi-scale inversion frequency is completed; and if the inversion is completed, using a last inversion result as a target inversion result.

Optionally, the convolutional neural network full waveform inversion module includes a P wave inversion module, an S wave inversion module, and a density inversion module.

Optionally, the determining an initial velocity and an RTM image corresponding to the current inversion frequency based on the observation data obtained after low-pass filtering specifically includes:

determining the initial velocity and the RTM image corresponding to the current inversion frequency by tomography or migration velocity analysis based on the observation data obtained after low-pass filtering.

Optionally, the observation data is initially collected shot data of seismic data.

A system for full waveform inversion on elastic wave seismic data includes a module construction unit, a multi-scale inversion frequency determining unit, a low-pass filtering unit, an input data determining unit, an inversion result determining unit, a determining unit, an iterative unit, and a target inversion result determining unit.

The module construction unit is configured to construct a convolutional neural network full waveform inversion module, where the convolutional neural network full waveform inversion module is configured to determine an inversion result based on an initial velocity and a reverse time migration (RTM) image.

The multi-scale inversion frequency determining unit is configured to: obtain observation data, and determine a multi-scale inversion frequency based on the observation data, where the multi-scale inversion frequency comprises a plurality of inversion frequencies sorted in order from low to high.

The low-pass filtering unit is configured to perform low-pass filtering on the observation data by using a current inversion frequency.

The input data determining unit is configured to determine an initial velocity and an RTM image corresponding to the current inversion frequency based on the observation data obtained after low-pass filtering.

The inversion result determining unit is configured to determine a current inversion result by using the convolutional neural network full waveform inversion module based on the initial velocity and the RTM image corresponding to the current inversion frequency.

The determining unit is configured to determine whether inversion performed at the multi-scale inversion frequency is completed.

The iterative unit is configured to: if the inversion is not completed, perform inversion on a next frequency based on the order of the inversion frequencies of the multi-scale inversion frequency, return to the low-pass filtering unit, perform smoothing processing on the current inversion result, and replace the initial velocity corresponding to the current inversion frequency with an inversion result obtained after smoothing processing until the inversion performed at the multi-scale inversion frequency is completed.

The target inversion result determining unit is configured to: if the inversion is completed, use a last inversion result as a target inversion result.

A device for full waveform inversion on elastic wave seismic data includes at least one processor, at least one memory, and computer program instructions stored in the memory, where the processor executes the computer program instructions to implement the method.

Optionally, the memory is a computer-readable storage medium.

According to the specific embodiments provided by the present disclosure, the present disclosure provides the following technical effects:

According to the method, system, and device for full waveform inversion on elastic wave seismic data provided by the present disclosure, the multi-scale inversion frequency is determined based on the observation data, and inversion starts from the low frequency. Iteration is performed by using the convolutional neural network full waveform inversion module. According to the present disclosure, multi-scale thought inversion is combined with deep learning inversion, and the inversion starts from the low frequency to the high frequency. At the low frequency, background velocity information is restored by the inversion method, while in the process of gradual inversion to the high frequency, detailed structure information of the network is gradually restored. This multi-scale thought of performing inversion from the low frequency to the high frequency obviously improves effect of the deep learning inversion. CNN-FWI inversions at different frequencies can be well connected by performing smoothing processing on the inversion result. If the smooth connection strategy is not performed, the multi-scale inversion process cannot be continued. Secondly, the smooth connection strategy can also improve effect of the inversion on the network.

BRIEF DESCRIPTION OF THE DRAWINGS

To describe the technical solutions in embodiments of the present disclosure or in the prior art more clearly, the accompanying drawings required for the embodiments are briefly described below. Apparently, the accompanying drawings in the following description show merely some embodiments of the present disclosure, and those of ordinary skill in the art may still derive other accompanying drawings from these accompanying drawings without creative efforts.

(FIG. 2B) and (FIG. 2F) are inversion results of the method provided by the present disclosure. (FIG. 2C) and (FIG. 2G) are full waveform inversion results of (FIG. 2B) and (FIG. 2F) as initial models, while (FIG. 2D) and (FIG. 2H) are full waveform inversion results of (FIG. 2A) and (FIG. 2E) as initial velocities)

DETAILED DESCRIPTION OF THE EMBODIMENTS

The technical solutions of the embodiments of the present disclosure are clearly and completely described below with reference to the drawings. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a method, system, and device for full waveform inversion on elastic wave seismic data, to implement high-accuracy velocity modeling, specifically implement inversion on a P wave velocity, an S wave velocity, and a density.

To make the above objectives, features, and advantages of the present disclosure clearer and more comprehensible, the present disclosure will be further described in detail below with reference to the accompanying drawings and the specific examples.

Figure 1:
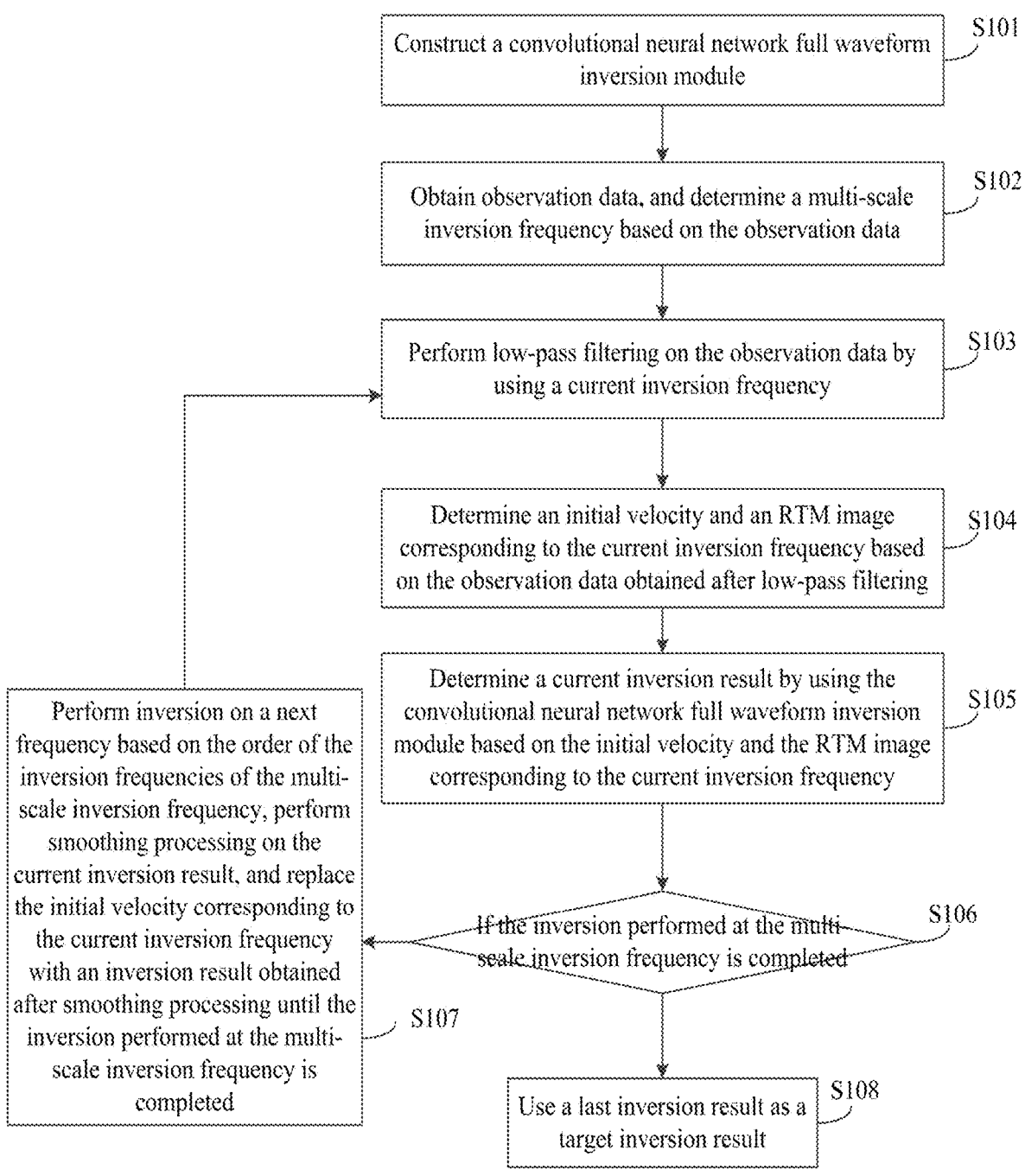
FIG. 1 is a schematic flowchart of a method for full waveform inversion on elastic wave seismic data according to the present disclosure.
Figure 2A:
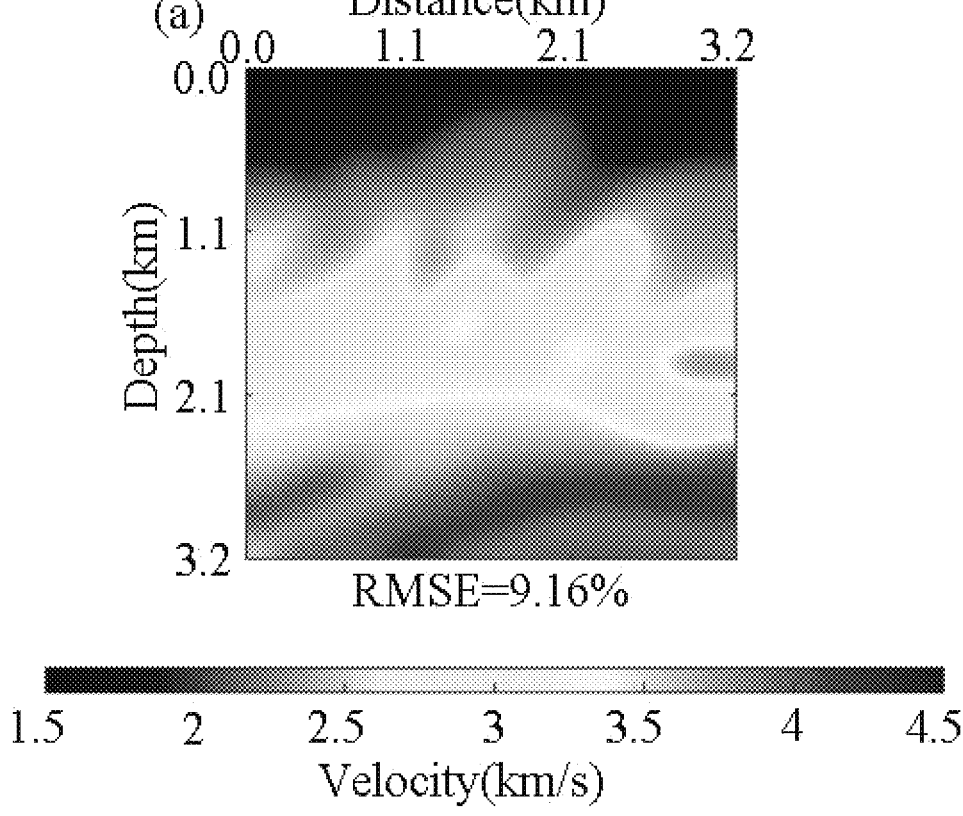
FIGS. 2A, 2B, 2C, 2D, 2E, 2F, 2G, and 2H are diagrams of comparison between a method in the present disclosure and a conventional full waveform inversion method (FIG. 2A) and (FIG. 2E) are initial velocities of inversion.
Figure 2B:
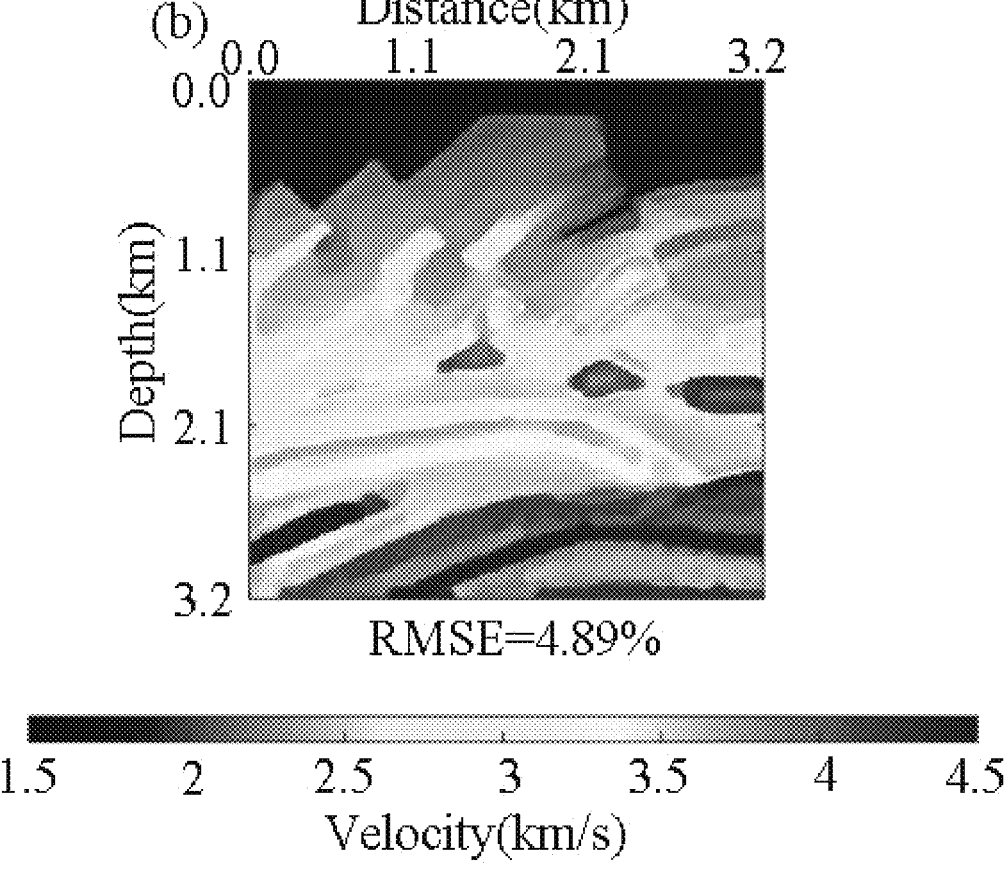
Figure 2C:
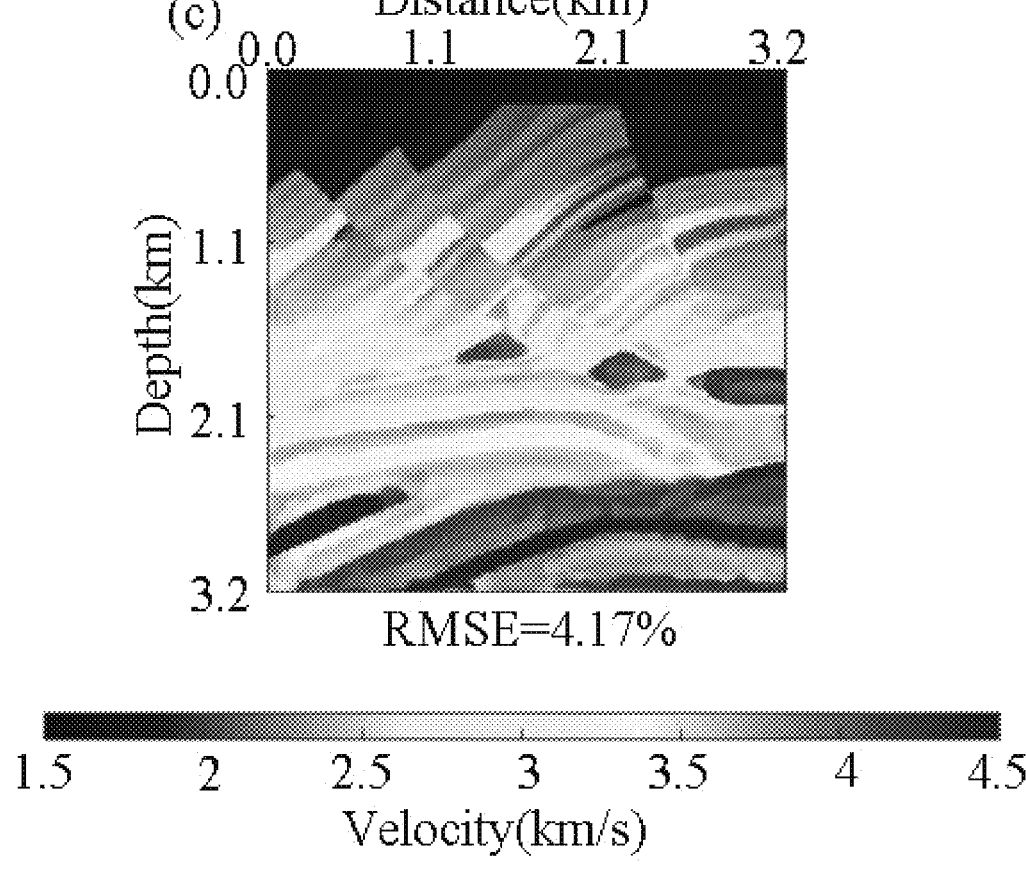
Figure 2D:
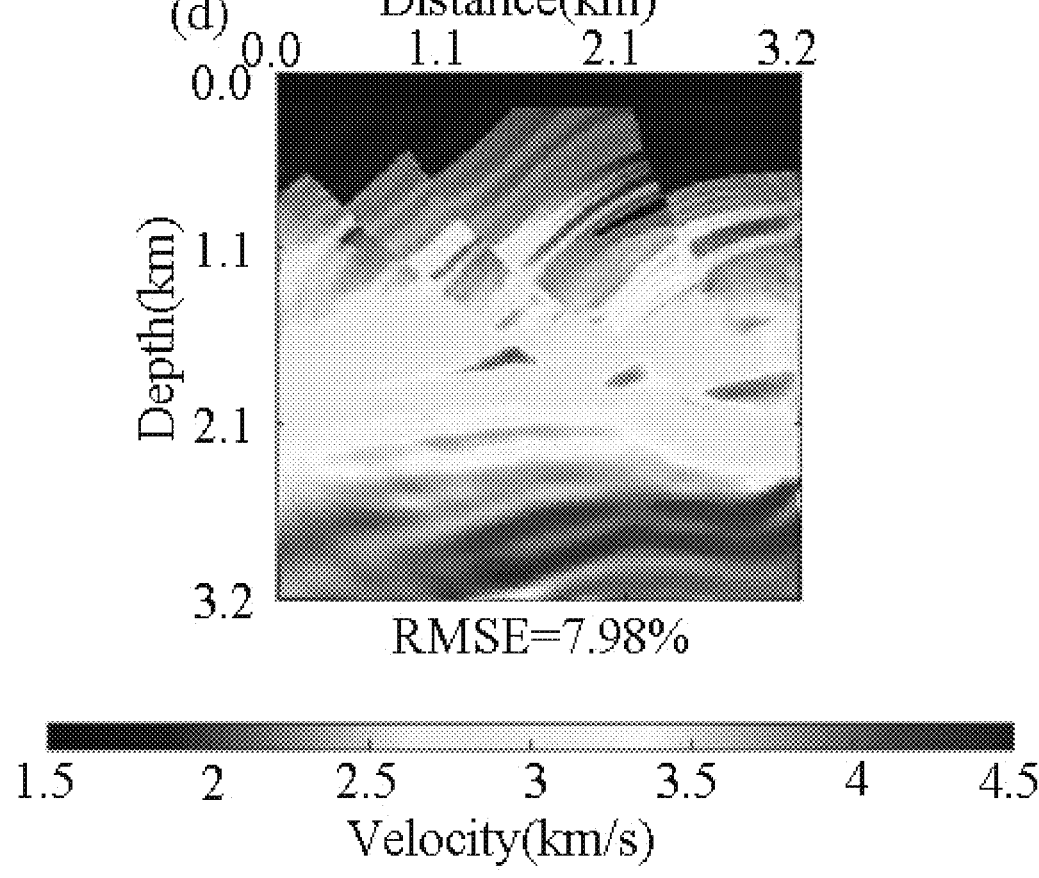
Figure 2E:
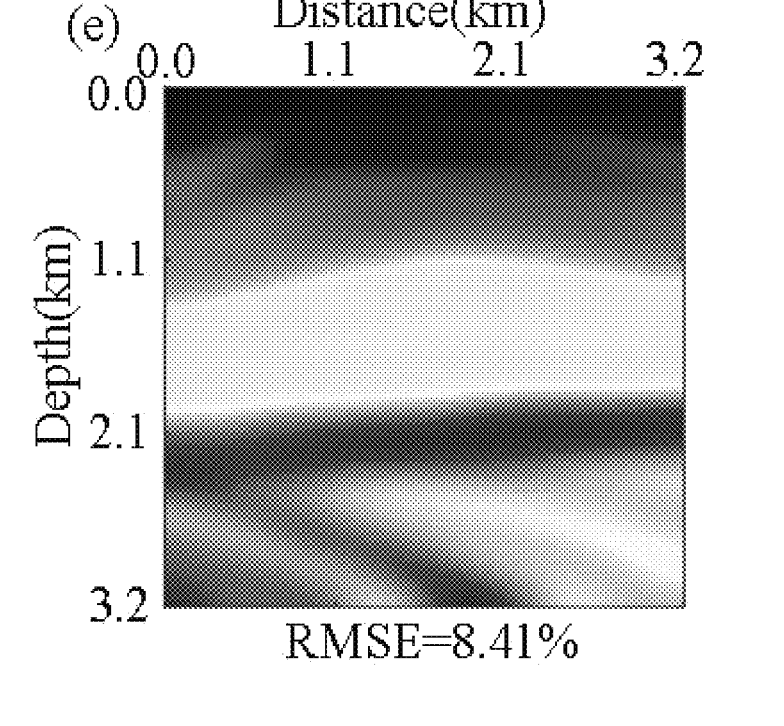
Figure 2F:
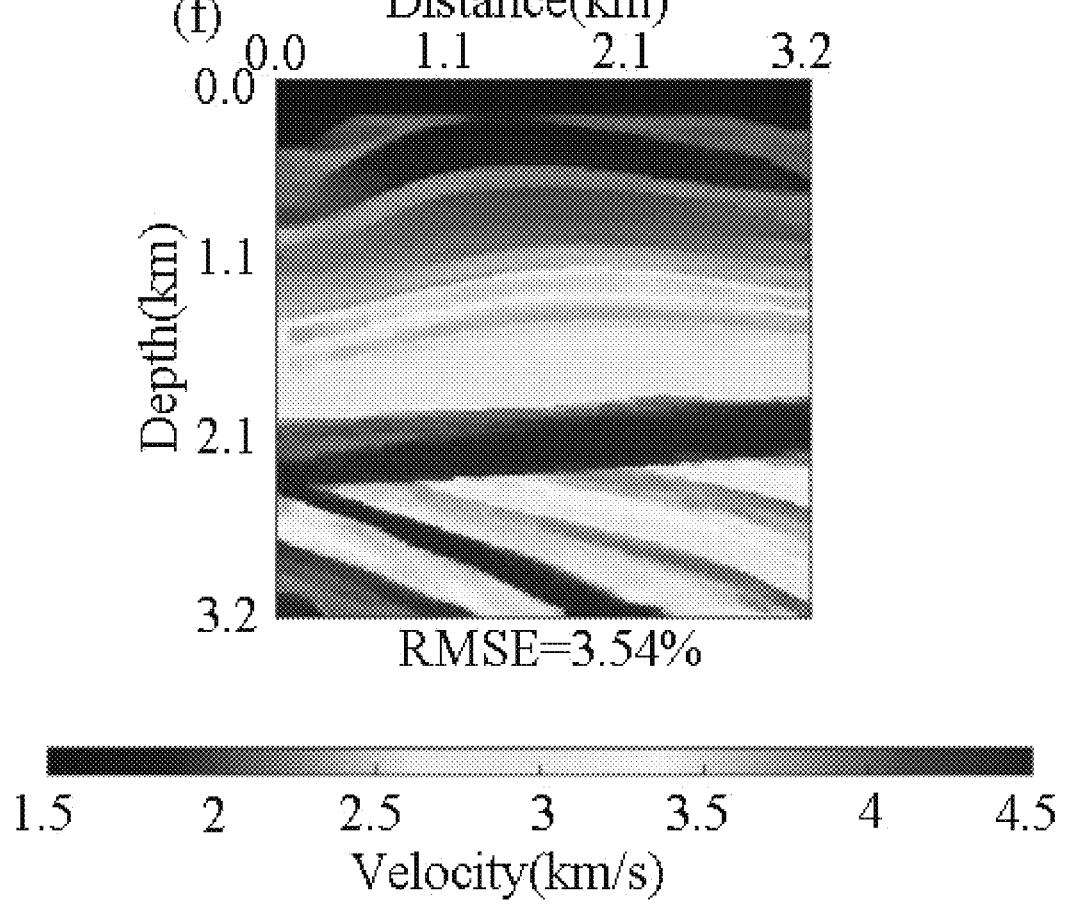
Figure 2G:
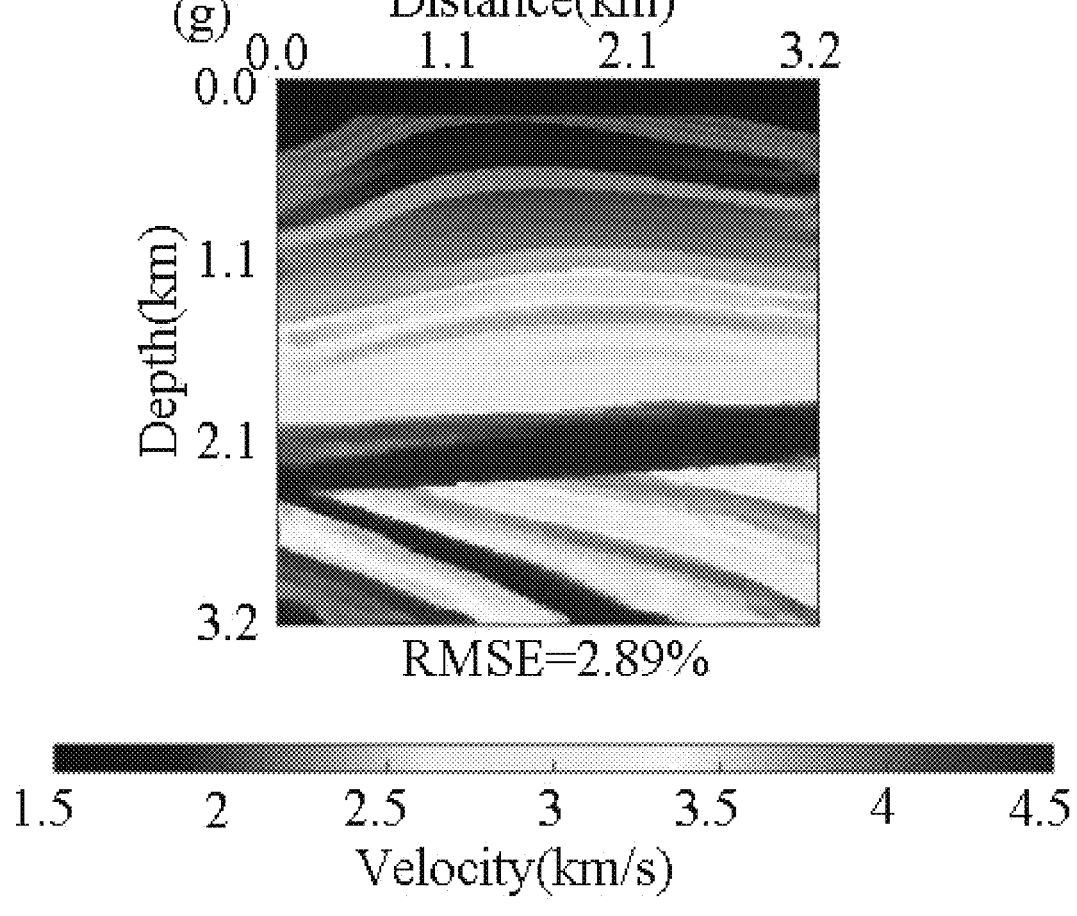
Figure 2H:
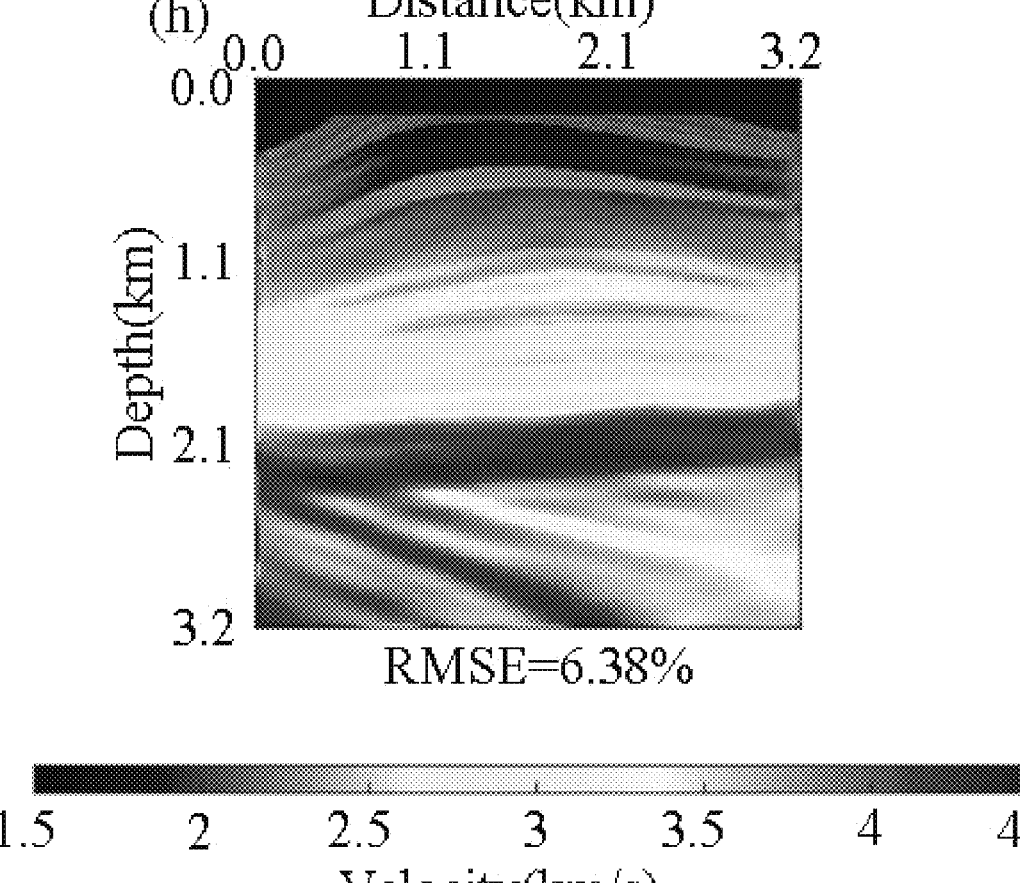
Figure 3A:
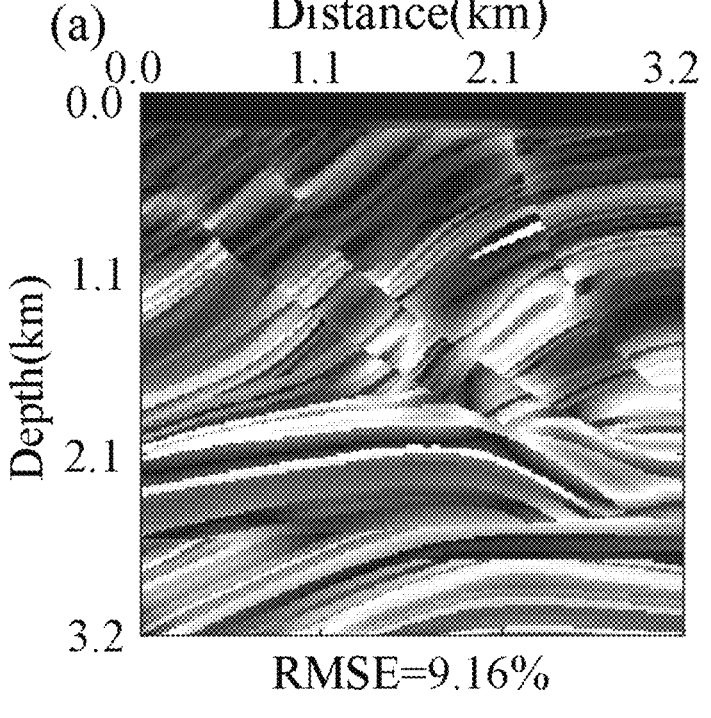
FIGS. 3A, 3B, 3C, 3D, 3E, 3F, 3G, and 3H are schematic diagrams of a difference between an inversion result and an accurate velocity.
Figure 3B:
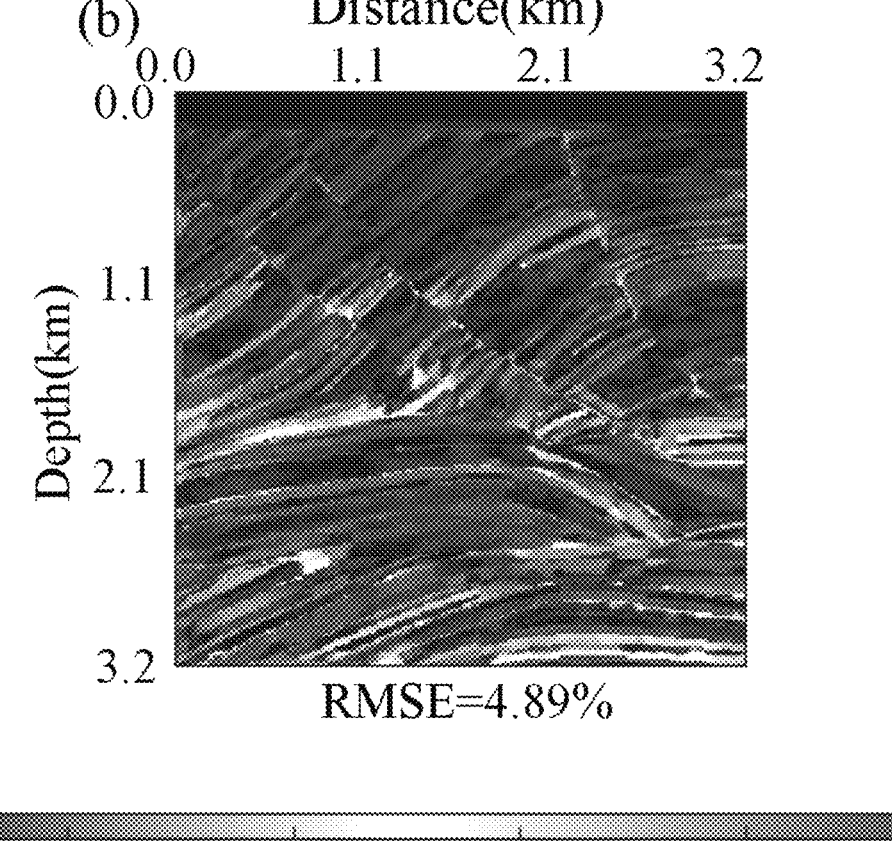
Figure 3C:
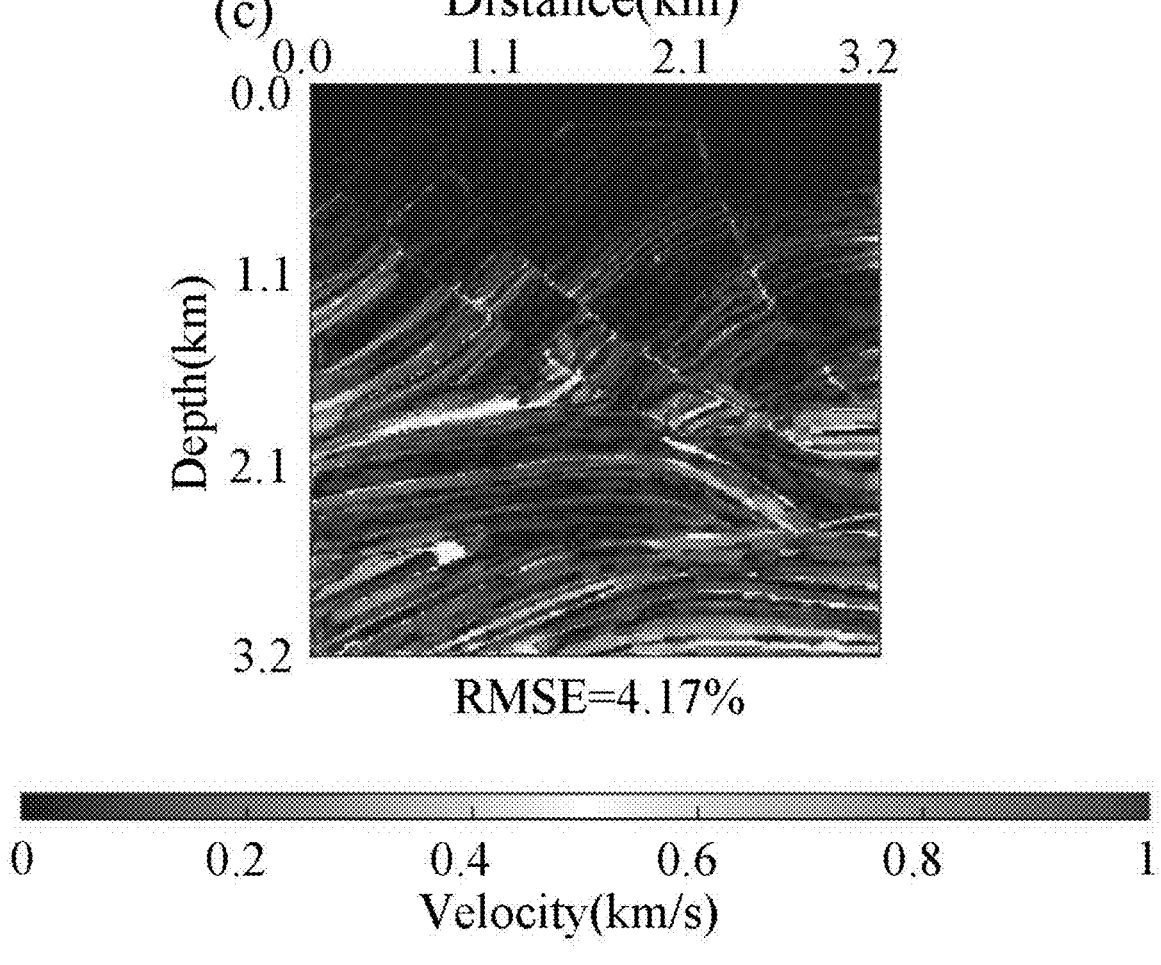
Figure 3D:
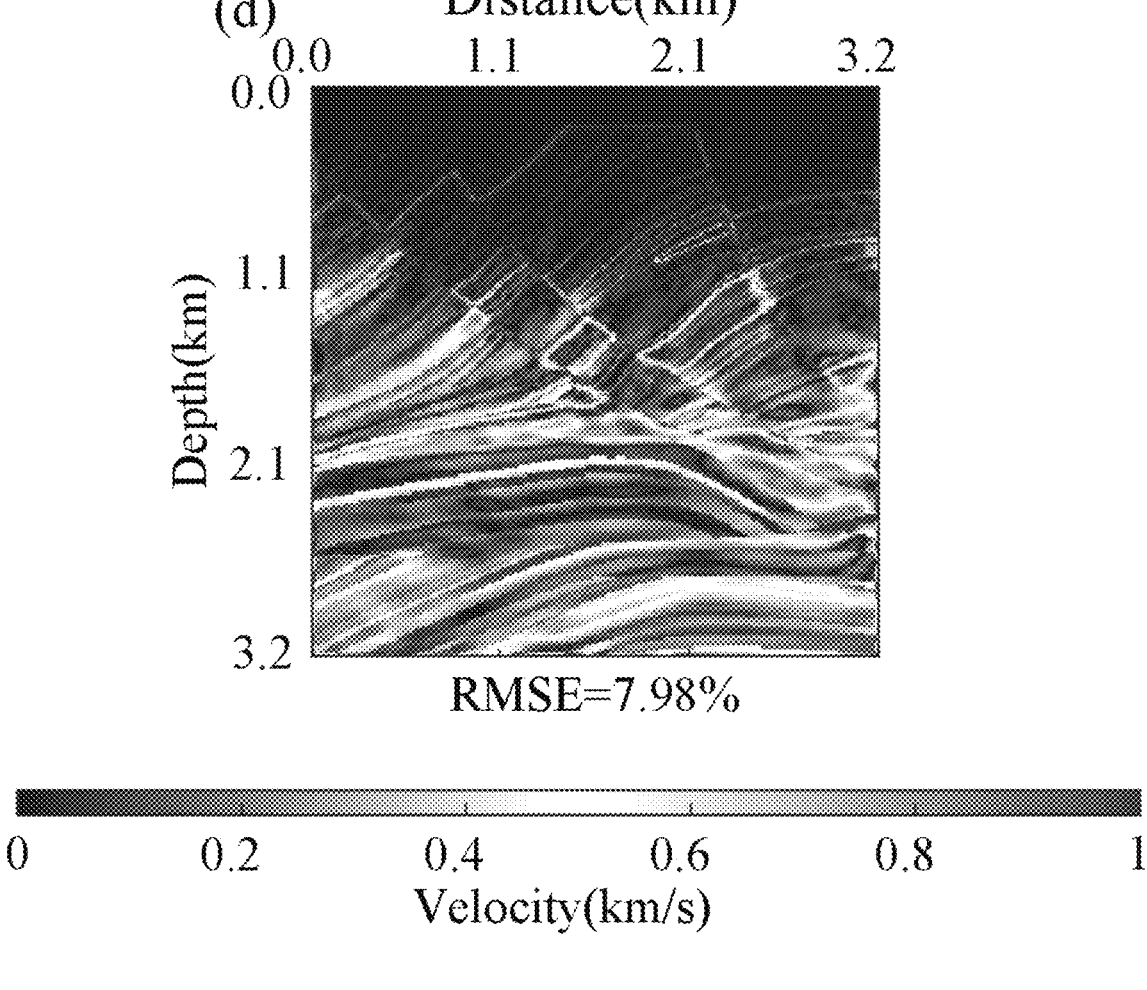
Figure 3E:
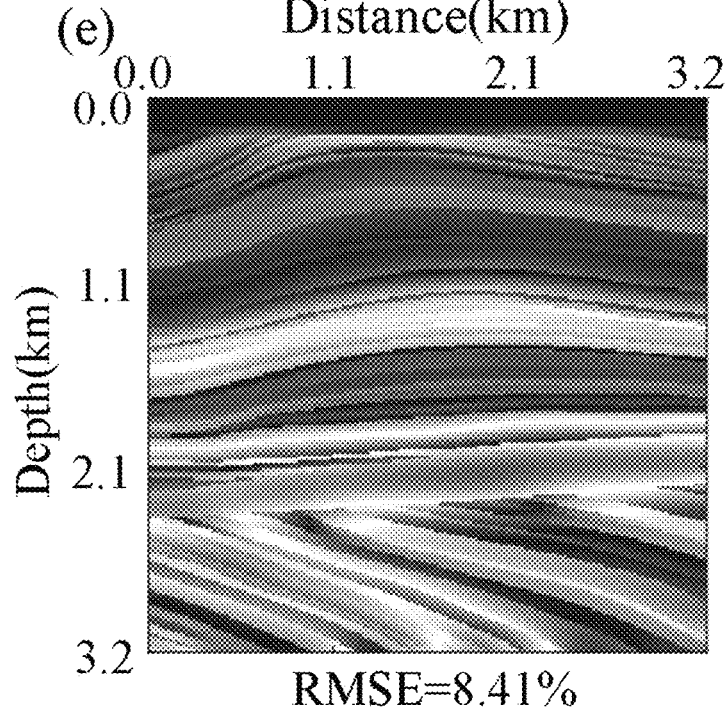
Figure 3F:
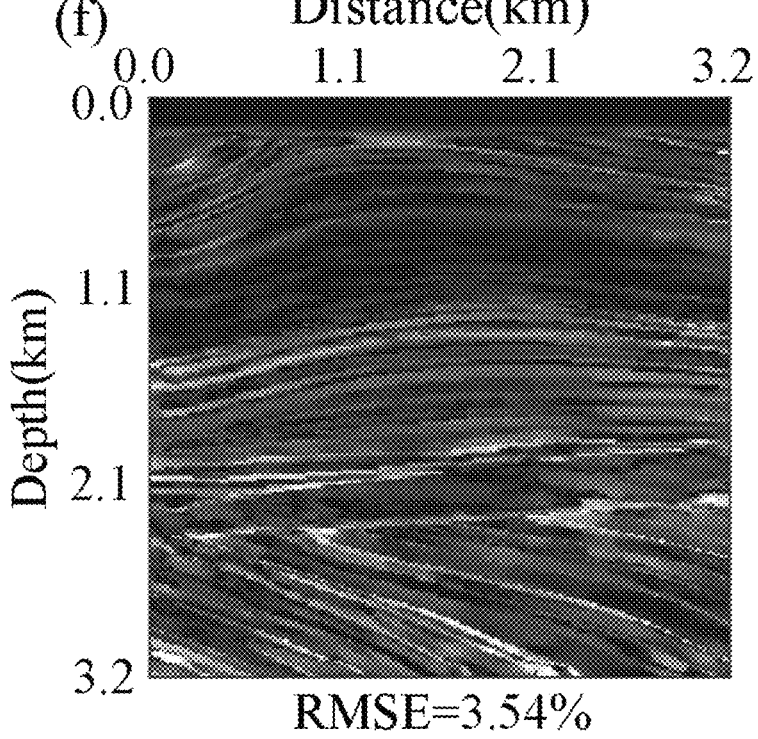
Figure 3F:
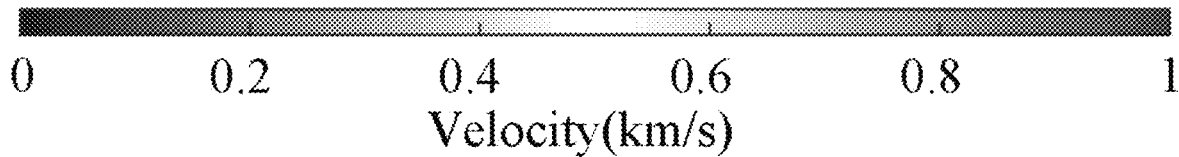
Figure 3G:
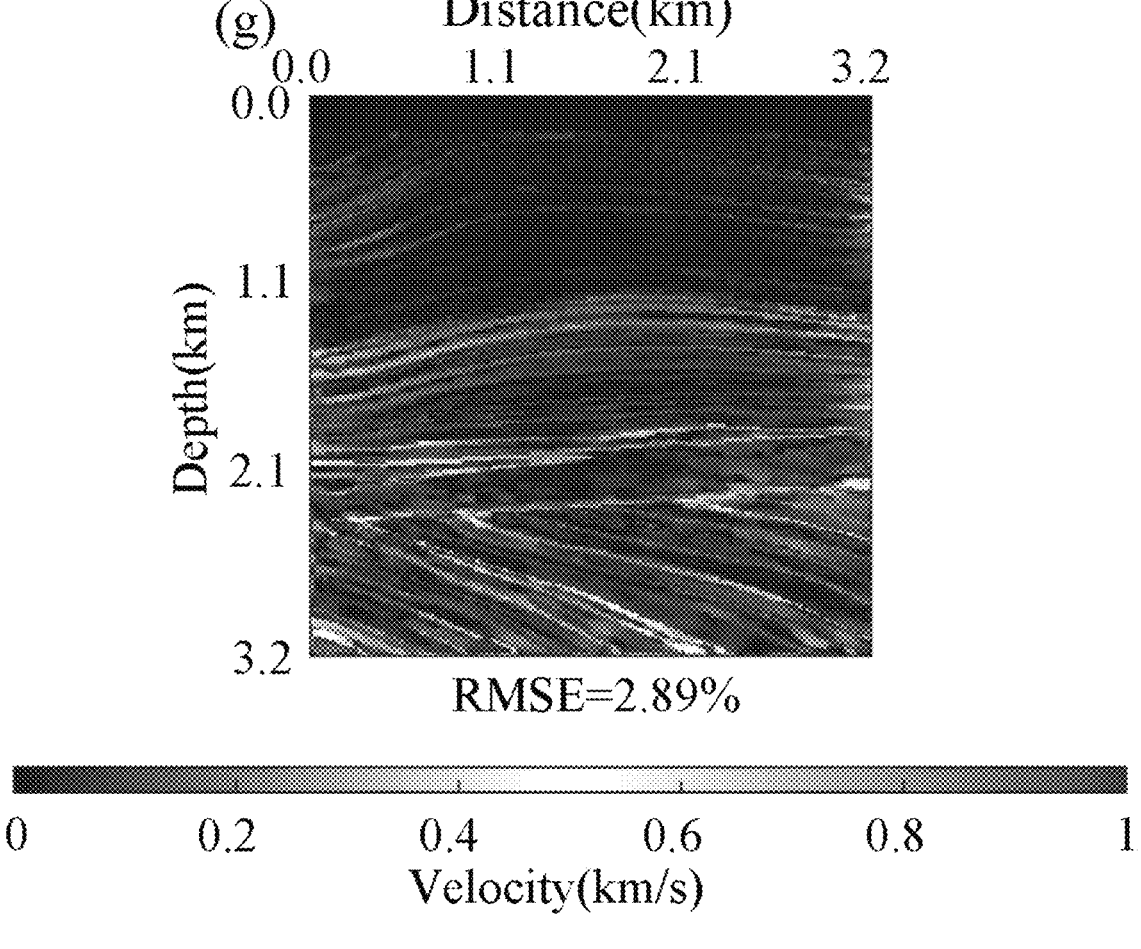
Figure 3H:
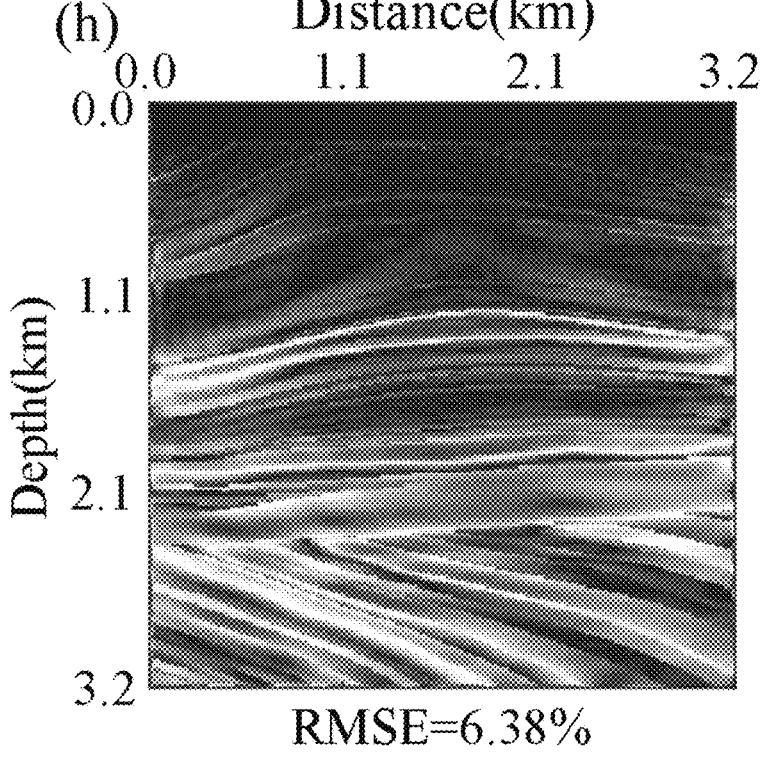

Referring to FIG. 1, a method for full waveform inversion on elastic wave seismic data includes the following steps.

S101: Construct a convolutional neural network full waveform inversion module (CNN-FWI module), where the convolutional neural network full waveform inversion module is a velocity construction model of a convolutional neural network, and is configured to determine an inversion result based on an initial velocity and a reverse time migration (RTM) image.

The CNN-FWI module includes input data of two channels, namely, the initial velocity and a reverse time migration image corresponding to this initial velocity. An initial model of inversion may be obtained by performing tomography or migration velocity analysis on observation data. Then, the data of the two channels including the initial velocity and the RTM are input into the CNN-FWI module to obtain a final inversion result of this inversion frequency.

The CNN-FWI module includes a P wave inversion module, an S wave inversion module, and a density inversion module. Specifically, input an initial P wave velocity and the RTM image, and output the inversion result. Input an initial S wave velocity and the RTM image, and output the inversion result. Input an initial density wave velocity and the RTM image, and output the inversion result.

The following uses a P wave velocity inversion module as an example.

An internal structure of the CNN-FWI module includes an internal loop process and an external loop process. The internal loop is a training process of a network, and the external loop is a prediction process of the network. The internal loop is combined with the external loop to realize mapping from an initial velocity to a more accurate velocity.

Firstly, the internal loop process of the network is a convolutional neural network (CNN) training process, including construction of a data set and training of the network. In the internal loop, firstly, the data set is constructed. Based on the initial velocity, a specific quantity of disturbance velocity training sets having characteristics similar to the initial velocity are constructed by a model segmentation method. Smoothing is performed on a disturbance velocity obtained after model segmentation to obtain the initial velocity, and RTM image corresponding to the initial velocity is obtained based on the initial velocity. So far, the internal loop cycle training set construction process is completed. An initial velocity and an RTM in the training set are used as the initial velocity and the initial RTM, the disturbance velocity is used as a tag, and a training process of the neural network is carried out to obtain a trained neural network. So far, the internal loop process of the network is completed, and the trained neural network is obtained.

The external loop process of the network is a prediction process of network. The trained neural network is obtained when the internal loop is completed, the initial velocity and the corresponding RTM are input into the trained neural network as the data of the two-channels, to obtain a more accurate velocity modeling result. Then, it is determined whether the result is converged. If the result is converged, the whole CNN-FWI module is finished. If the result is not converged, an output result of this iterative network is input into a next internal loop. Model segmentation is performed on the next internal loop based on the prediction result, to construct a training set for a next inner loop network training.

The multi-scale convolutional neural network full waveform inversion method for the elastic wave provided by the present disclosure can simultaneously perform inversion on the P wave velocity, the S wave velocity, and the density, so that inversion effect of a deep velocity characteristic is obviously better than inversion effect of a conventional full waveform inversion method, a generalization capability is good.

S102: Obtain the observation data, and determine a multi-scale inversion frequency based on the observation data, where the multi-scale inversion frequency comprises a plurality of inversion frequencies sorted in order from low to high, inversion starts from a low frequency, where the observation data is initially collected shot data of seismic data. That is, this is a strategy of performing inversion from a low frequency to a high frequency. Firstly, the multi-scale inversion frequency is selected, for example, the inversion frequency may be 5 Hz, 10 Hz, 15 Hz, and 20 Hz for an inversion process from 5 Hz to 20 Hz. A deep learning inversion process of a first selected frequency is performed first. The low-pass filtering is performed on the observation data based on the inversion frequency. An input of the CNN-FWI module is constructed.

S103: Perform low-pass filtering on the observation data by using a current inversion frequency.

S104: Determine the initial velocity and the RTM image corresponding to the current inversion frequency based on the observation data obtained after low-pass filtering, specifically, determine the initial velocity and the RTM image corresponding to the current inversion frequency by tomography or migration velocity analysis.

S105: Determine a current inversion result by using the convolutional neural network full waveform inversion module based on the initial velocity and the RTM image corresponding to the current inversion frequency.

S106: Determine whether inversion performed at the multi-scale inversion frequency is completed.

S107: If the inversion is not completed, perform inversion on a next frequency based on the order of the inversion frequencies of the multi-scale inversion frequency, return to S103, perform smoothing processing on the current inversion result, and replace the initial velocity corresponding to the current inversion frequency with an inversion result obtained after smoothing processing until the inversion performed at the multi-scale inversion frequency is completed.

Perform smoothing processing on the current inversion result, to adapt to inversion characteristics of CNN-FWI. Perform a small number of smoothing operations on output data of the CNN-FWI module, to adapt to inversion on the next frequency. In the present disclosure, the small number of smoothing operations are referred to as a smooth connection strategy which can connect inversion processes at different frequencies to form a complete multi-scale inversion process.

S108: If the inversion is completed, use a last inversion result as a target inversion result, and determine an underground medium structure based on the target inversion result.

As shown in FIGS. 2A-H, overall inversion effect of the multi-scale CNN-FWI result of the present disclosure is much better than a conventional full waveform inversion (FWI) method. For inversion of a deep velocity structure, the method of the present disclosure is much better than the conventional FWI. It proves that the present disclosure has remarkable effect of a deep velocity inversion. If FWI is further performed on the inversion result of the present disclosure, a more refined modeling result is obtained.

FIGS. 3A-H are schematic diagrams of a difference between an inversion result and an accurate velocity. As shown in FIGS. 3A-H, each subgraph corresponds to a difference between each modeling result and the accurate velocity in FIGS. 2A-H. It can be found that, a difference between the inversion result obtained by the method provided by the present disclosure and the accurate velocity is much smaller than a difference between an inversion result obtained by a conventional FWI and the accurate velocity.

For the foregoing method, the present disclosure further provides a system for full waveform inversion on elastic wave seismic data. The system includes a module construction unit, a multi-scale inversion frequency determining unit, a low-pass filtering unit, an input data determining unit, an inversion result determining unit, a determining unit, an iterative unit, and a target inversion result determining unit.

The module construction unit is configured to construct a convolutional neural network full waveform inversion module, where the convolutional neural network full waveform inversion module is configured to determine an inversion result based on an initial velocity and a reverse time migration (RTM) image.

The multi-scale inversion frequency determining unit is configured to: obtain observation data; determine a multi-scale inversion frequency based on the observation data, where the multi-scale inversion frequency comprises a plurality of inversion frequencies sorted in order from low to high.

The low-pass filtering unit is configured to perform low-pass filtering on the observation data by using a current inversion frequency.

The input data determining unit is configured to determine an initial velocity and an RTM image corresponding to the current inversion frequency based on the observation data obtained after low-pass filtering.

The inversion result determining unit is configured to determine a current inversion result by using the convolutional neural network full waveform inversion module based on the initial velocity and the RTM image corresponding to the current inversion frequency.

The determining unit is configured to determine whether inversion performed at the multi-scale inversion frequency is completed.

The iterative unit is configured to: if the inversion is not completed, perform inversion on a next frequency based on the order of the inversion frequencies of the multi-scale inversion frequency, return to the low-pass filtering unit, perform smoothing processing on the current inversion result, and replace the initial velocity corresponding to the current inversion frequency with an inversion result obtained after smoothing processing until the inversion performed at the multi-scale inversion frequency is completed.

The target inversion result determining unit is configured to: if the inversion is completed, use a last inversion result as a target inversion result.

To perform the method corresponding to Embodiment 1 and implement the corresponding functions and technical effects, the present disclosure further provides a device for full waveform inversion on elastic wave seismic data. The device includes at least one processor, at least one memory, and computer program instructions stored in the memory, where the processor executes the computer program instructions to implement the method.

The memory is a computer-readable storage medium.

Based on such description, the technical solutions of the present disclosure essentially or the part contributing to the prior art may be implemented in a form of a software product. The computer software product is stored in a storage medium, and includes several instructions for enabling a computer device (which may be a personal computer, a server, a network device, or the like) to perform all or some steps of the methods described in the embodiments of the present disclosure. The foregoing computer storage medium includes any medium that can store program code, such as a USB flash drive, a removable hard disk, a read-only memory, a random access memory, a magnetic disk, or an optical disc.

Each embodiment of the present specification is described in a progressive manner, each embodiment focuses on the difference from other embodiments, and the same and similar parts between the embodiments may refer to each other. Since the system disclosed in an embodiment corresponds to the method disclosed in another embodiment, the description is relatively simple, and reference can be made to the method description.

Specific examples are used herein to explain the principles and implementations of the present disclosure. The foregoing description of the embodiments is merely intended to help understand the method of the present disclosure and its core ideas; besides, various modifications may be made by a person of ordinary skill in the art to specific embodiments and the scope of application in accordance with the ideas of the present disclosure. In conclusion, the content of the present specification shall not be construed as limitations to the present disclosure.

What is claimed is:

1. A method for full waveform inversion on elastic wave seismic data, comprising:

constructing a convolutional neural network full waveform inversion module, wherein the convolutional neural network full waveform inversion module is configured to determine an inversion result based on an initial velocity and a reverse time migration (RTM) image;

obtaining observation data, and determining a multi-scale inversion frequency based on the observation data, wherein the multi-scale inversion frequency comprises a plurality of inversion frequencies sorted in order from low to high, and inversion starts from a low frequency;

performing low-pass filtering on the observation data by using a current inversion frequency;

determining an initial velocity and an RTM image corresponding to the current inversion frequency based on the observation data obtained after low-pass filtering;

determining a current inversion result by using the convolutional neural network full waveform inversion module based on the initial velocity and the RTM image corresponding to the current inversion frequency;

determining whether inversion performed at the multi-scale inversion frequency is completed;

if the inversion is not completed, performing inversion on a next frequency based on the order of the inversion frequencies of the multi-scale inversion frequency, returning to the step of performing low-pass filtering on the observation data by using a current inversion frequency, performing smoothing processing on the current inversion result, and replacing the initial velocity corresponding to the current inversion frequency with an inversion result obtained after smoothing processing until the inversion performed at the multi-scale inversion frequency is completed; and if the inversion is completed, using a last inversion result as a target inversion result.

2. The method for full waveform inversion on elastic wave seismic data according to claim 1, wherein the convolutional neural network full waveform inversion module comprises a P wave inversion module, an S wave inversion module, and a density inversion module.

3. The method for full waveform inversion on elastic wave seismic data according to claim 1, wherein the determining an initial velocity and an RTM image corresponding to the current inversion frequency based on the observation data obtained after low-pass filtering specifically comprises:

determining the initial velocity and the RTM image corresponding to the current inversion frequency by tomography or migration velocity analysis based on the observation data obtained after low-pass filtering.

4. The method for full waveform inversion on elastic wave seismic data according to claim 1, wherein the observation data is initially collected shot data of seismic data.

5. A device for full waveform inversion on elastic wave seismic data, comprising: at least one processor, at least one memory, and a non-transitory computer program instructions stored in the non-transitory memory, wherein the processor executes the computer non-transitory program instructions to implement the method according to claim 1.

6. The device for full waveform inversion on elastic wave seismic data according to claim 5, wherein the convolutional neural network full waveform inversion module comprises a P wave inversion module, an S wave inversion module, and a density inversion module.

7. The device for full waveform inversion on elastic wave seismic data according to claim 6, wherein the memory is a non-transitory computer-readable storage medium.

8. The device for full waveform inversion on elastic wave seismic data according to claim 5, wherein the determining an initial velocity and an RTM image corresponding to the current inversion frequency based on the observation data obtained after low-pass filtering specifically comprises:

determining the initial velocity and the RTM image corresponding to the current inversion frequency by tomography or migration velocity analysis based on the observation data obtained after low-pass filtering.

9. The device for full waveform inversion on elastic wave seismic data according to claim 8, wherein the memory is a non-transitory computer-readable storage medium.

10. The device for full waveform inversion on elastic wave seismic data according to claim 5, wherein the observation data is initially collected shot data of seismic data.

11. The device for full waveform inversion on elastic wave seismic data according to claim 10, wherein the memory is a non-transitory computer-readable storage medium.

12. The device for full waveform inversion on elastic wave seismic data according to claim 5, wherein the memory is a non-transitory computer-readable storage medium.

13. A system for full waveform inversion on elastic wave seismic data, comprising:

a module construction unit, configured to construct a convolutional neural network full waveform inversion module, wherein the convolutional neural network full waveform inversion module is configured to determine an inversion result based on an initial velocity and a reverse time migration (RTM) image;

a multi-scale inversion frequency determining unit, configured to: obtain observation data, and determine a multi-scale inversion frequency based on the observation data, wherein the multi-scale inversion frequency comprises a plurality of inversion frequencies sorted in order from low to high, and inversion starts from a low frequency;

a low-pass filtering unit, configured to perform low-pass filtering on the observation data by using a current inversion frequency;

an input data determining unit, configured to determine an initial velocity and an RTM image corresponding to the current inversion frequency based on the observation data obtained after low-pass filtering;

an inversion result determining unit, configured to determine a current inversion result by using the convolutional neural network full waveform inversion module based on the initial velocity and the RTM image corresponding to the current inversion frequency;

a determining unit, configured to determine whether inversion performed at the multi-scale inversion frequency is completed;

an iterative unit, configured to: if the inversion is not completed, perform inversion on a next frequency based on the order of the inversion frequencies of the multi-scale inversion frequency, return to the low-pass filtering unit, perform smoothing processing on the current inversion result, and replace the initial velocity corresponding to the current inversion frequency with an inversion result obtained after smoothing processing until the inversion performed at the multi-scale inversion frequency is completed; and a target inversion result determining unit, configured to: if the inversion is completed, use a last inversion result as a target inversion result.

* * * * *